C. D. BRIDDELL.
TONGS.
APPLICATION FILED NOV. 24, 1920.

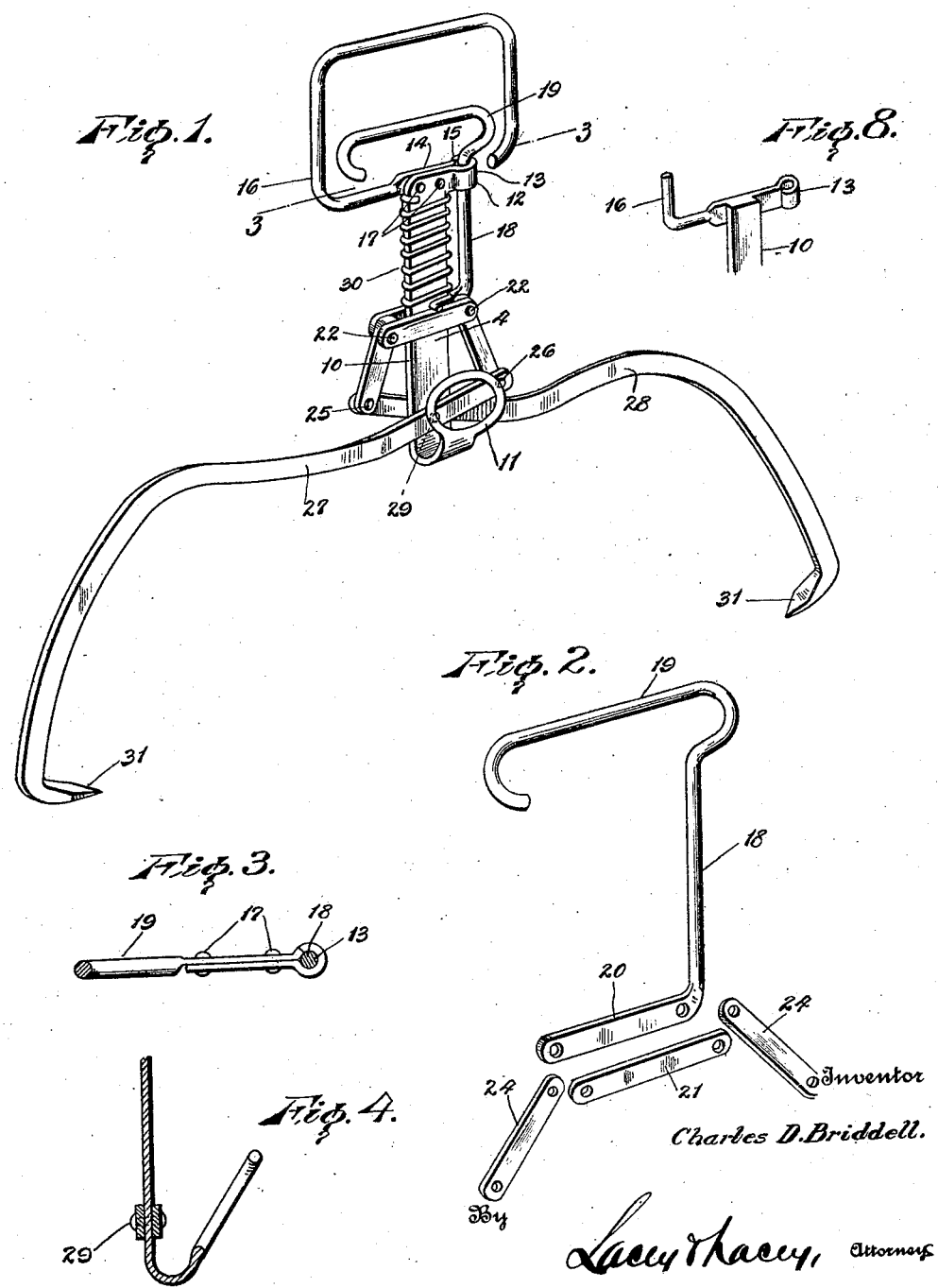

1,415,143. Patented May 9, 1922.
2 SHEETS—SHEET 2.

Inventor
Charles D. Briddell.

By Lacey & Lacey, Attorneys

UNITED STATES PATENT OFFICE.

CHARLES D. BRIDDELL, OF CRISFIELD, MARYLAND.

TONGS.

1,415,143. Specification of Letters Patent. Patented May 9, 1922.

Application filed November 24, 1920. Serial No. 426,241.

*To all whom it may concern:*

Be it known that I, CHARLES D. BRIDDELL, a citizen of the United States, residing at Crisfield, in the county of Somerset and State of Maryland, have invented certain new and useful Improvements in Tongs, of which the following is a specification.

This invention relates to tongs of that class especially adapted for handling cakes of ice and the like.

One of the objects of the present invention resides in the provision of a pair of tongs of the above mentioned character which is so constructed that the crossed grapple hooks of the tongs are connected by toggle members which, in turn, are associated with a supplemental handle member for closing the tongs when a pull is exerted thereon.

Another feature of the invention resides in the specific construction of an arrangement of the toggle members in connection with the shank of the lifting handle whereby the said shank forms a guide for the toggle members.

Still another object of the invention resides in the provision of means projecting in a plane at right angles to the plane of the grapples and constituting a handle for elevating the loaded grapples to a horizontal position from the vertical, as for instance in placing a heavy cake of ice into an ice box, where the ice is first lifted to the required height and the tongs are then moved to a horizontal position for better placing the ice into the proper compartment of the ice box.

In the drawings:

Figure 1 is a perspective view of one embodiment of the present invention;

Figure 2 is a perspective view of the dissembled parts of the supplemental handle and the associated parts;

Figure 3 is a sectional view on the line 3—3 of Figure 1;

Figure 4 is a vertical section on the line 4—4 of Figure 1;

Figure 8 is a perspective detail of a modification of a portion of Figure 1.

Figure 5:
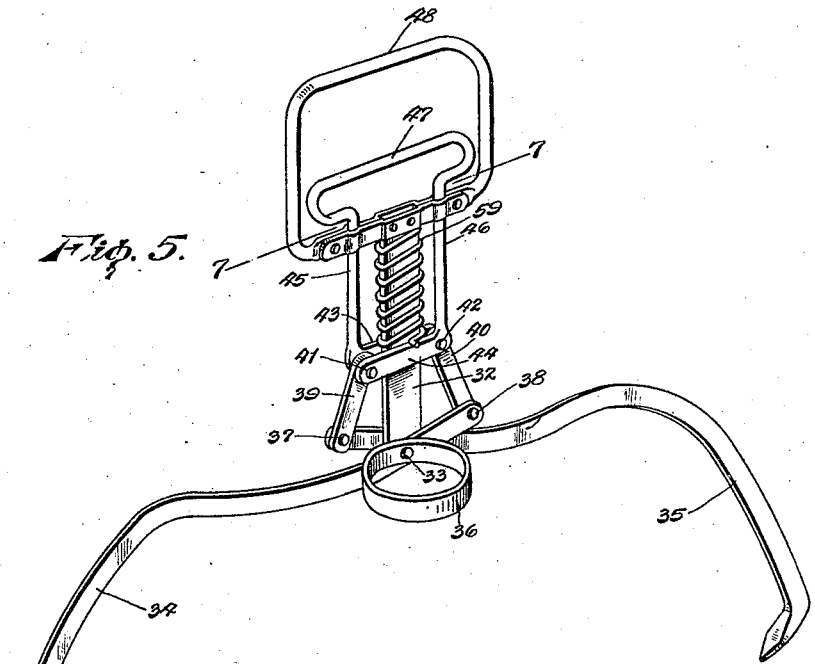
Figure 5 is a perspective view of a modified form of the invention.

In detail:

With particular reference to the form of the invention shown in Figures 1 to 4 inclusive, the tongs comprise a handle shank 10 bent upwardly at one end, as shown at 11, to form a handle, the other end thereof being bent at right angles as shown at 12, and curved as at 13 to provide one-half of a guiding loop, the other half being formed by the flattened end 14, shaped as shown at 15, of a handle 16 riveted as at 17 to the said upper end of the shank 10. Projecting through the guiding loop thus formed is the shank 18 of a supplemental handle member 19 lying within the handle member 16. The lower end of the shank 18 is bent at right angles, as shown at 20, and lies at one side of the shank 10 and cooperates with a link 21 to form a connection having pivots 22 associating the members 20 and 21 with the toggle links 24 pivoted as at 25 and 26 to the upper ends of the grapple jaws 27 and 28 which are crossed, as shown, and pivoted to each other and to the shank 10 by the pivot pin 29, the said grapple jaws being located on opposite sides of the shank 10.

A spring 30 is coiled around the shank 10 between the links 20 and 21 and the portions forming the guiding loop by reason of which the jaws are always maintained in the open position shown in Figure 1.

In taking up a piece of ice the operator places the tongs over the piece and suddenly snaps them together by drawing up on the handle 19 with the result that the points 31 of said jaws are firmly engaged with the ice and when the operator grasps the tongs firmly for carrying the ice they continue in such relation and, by reason of the fact that the handle 19 being drawn upwardly closes the jaws, the lifting movement maintains the jaws in engagement with the cake of ice.

After elevating the cake of ice to the required height, the operator may grasp the handle 11 and raise the tongs to the horizontal position for shoving the cake of ice into place within an ice compartment.

It will be noted that the shank member 10 extending between the links 20 and 21 guides the toggle links 24 in their movement with respect to the said shank 10.

In Figure 8 it will be noted that the construction is the same as that previously described except that rivets 17 are eliminated by welding part 16 to part 10.

Figure 6:
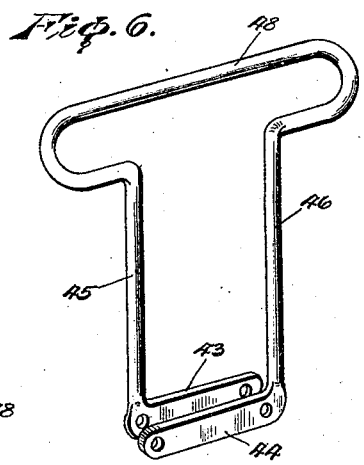
Figure 6 is a perspective view of the supplemental handle thereof.
Figure 7:
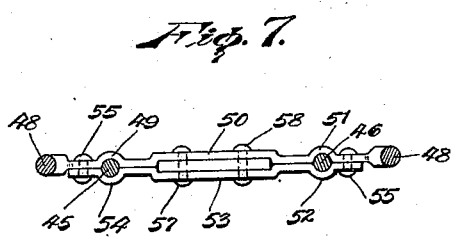
Figure 7 is a sectional view on the line 7—7 of Figure 5.

In the form of the invention shown in Figures 5 to 7, the handle shank 32 has pivoted to the lower end thereof, as at 33, the grapple jaws 34 and 35 which are crossed as shown. Also the pivot 33 carries a handle loop 36. To the ends of the grapple jaws are pivoted, as at 37 and 38, the links 39 and 40 respectively connecting at 41 and 42 with the bar links 43 and 44 formed on the ends of guide shanks 45 and 46 terminating in the supplemental handle 47. The main handle 48 has one end brought inwardly at right angles to the shank 32 and flattened and bent as at 49, 50 and 51 and passing on one side of the shank 32 while the other end of the said handle 48 is similarly bent at 52, 53 and 54 to pass on the other side of the shank and both portions are riveted together as at 55 and riveted to the shank 32 as at 57 and 58. The loops formed by the bends 49, 54 and 51, 52 provide guides for the shanks 45 and 46. A spring 59 is confined between the flattened portions of the handle member 48 and the bar links 43 and 44 so that the jaws are normally maintained in the open position shown in Figure 5.

The particular advantages of the foregoing construction reside in the arrangement of the handle 47 with respect to the toggle whereby the pull is directly upward on each toggle connection. The operation of this pair of tongs is substantially identical with the tongs described in connection with Figures 1 to 4.

Having thus described the invention, what is claimed as new is:

1. In a pair of tongs, a handle shank, a pair of grapple jaws crossed and pivotally associated with said handle shank and with each other at the point of crossing, a handle carried by said shank, a guide at the base of said handle, a supplemental handle within the main handle and working in said guide, and toggle means connecting the supplemental handle with the crossed ends of said jaws.

2. In combination with a pair of grapple jaws crossed and pivotally associated approximate one end, a main handle connected with one end of the shank and forming part of a guide member, the end of said shank providing the other part of said guide member, a supplemental handle having a shank working in said guide members, and means connecting the shank of the supplemental handle with the crossed ends of said grapple jaws.

3. In combination with a pair of grapple jaws crossed and pivotally associated approximate their upper ends, a main handle connected with one end of the shank and forming part of a guide member, the end of said shank providing the other part of said guide member, a supplemental handle having a shank working in said guide members, means connecting the shank of the supplemental handle with the crossed ends of said grapple jaws, and spring means maintaining the jaws in open position.

4. In combination with a pair of grapple jaws crossed and pivotally associated approximate their upper ends, a main handle connected with one end of the shank and forming part of a guide member, the end of said shank providing the other part of said guide member, a supplemental handle having a shank working in said guide members, means connecting the shank of the supplemental handle with the crossed ends of said grapple jaws, and spring means surrounding said shank and maintaining the jaws in open position.

5. In combination with a pair of grapple jaws and a handle shank all pivotally associated, a handle at each end of said shank, a jaw operating handle guided by said shank, and means connecting said last-mentioned handle with said jaws.

6. In combination with a pair of grapple jaws and a handle shank all pivotally associated, a handle at each end of said shank, a jaw operating handle within one of said previously-mentioned handles, and means connecting said operating handle with said jaws.

7. In combination with a pair of grapple jaws and a handle shank all pivotally associated, a handle at each end of said shank, a jaw operating handle within one of said previously-mentioned handles, means connecting said operating handle with said jaws, and means carried by said shank for tensioning the jaws in an open position.

In testimony whereof I affix my signature.

CARLES D. BRIDDELL. [L. S.]